United States Patent
Lin et al.

(10) Patent No.: US 6,281,280 B1
(45) Date of Patent: Aug. 28, 2001

(54) LOW-GLOSS PAINTS INCLUDING POLYVINYLIDENE FLUORIDE HAVING A HIGH MELT VISCOSITY

(75) Inventors: Shiow-Ching Lin, Randolph; Steven John Burks, Long Valley; Bradley Lane Kent, Bedminster; Craig Norman Kamsler, North Brunswick, all of NJ (US)

(73) Assignee: Ausimont USA, Inc., Thorofare, NJ (US)

(*) Notice: Subject to any disclaimer, the term of this patent is extended or adjusted under 35 U.S.C. 154(b) by 0 days.

(21) Appl. No.: 08/383,238

(22) Filed: Feb. 3, 1995

(51) Int. Cl.[7] .................... C08J 5/10; C08K 5/01; C08L 51/00; C08L 61/00
(52) U.S. Cl. .................... 524/542; 524/502; 525/199
(58) Field of Search .................... 525/199; 524/545, 524/502

(56) References Cited

U.S. PATENT DOCUMENTS

| | | | |
|---|---|---|---|
| 4,317,861 | 3/1982 | Kidoh et al. | 428/421 |
| 4,400,487 * | 8/1983 | Stoneberg et al. | 525/199 |
| 4,546,149 | 10/1985 | Kidoh et al. | 525/199 |
| 4,549,921 | 10/1985 | Wolfe, Jr. | 156/272.6 |
| 4,582,864 | 4/1986 | Abe et al. | 523/220 |
| 5,087,680 | 2/1992 | Duan et al. | 526/254 |
| 5,095,081 * | 3/1992 | Bacque et al. | 526/216 |
| 5,177,126 | 1/1993 | Moore et al. | 523/458 |
| 5,177,150 | 1/1993 | Polek | 525/199 |
| 5,346,727 * | 9/1994 | Simkin | 427/486 |

FOREIGN PATENT DOCUMENTS

| | | |
|---|---|---|
| 2056636 | 4/1971 | (FR) . |
| 2659973 | 9/1991 | (FR) . |
| 57-143521 | 9/1982 | (JP) . |
| 59-216915 | 12/1984 | (JP) . |
| 3-14840 | 1/1991 | (JP) . |
| 3-115453 | 5/1991 | (JP) . |
| 6-234141 | 8/1994 | (JP) . |

OTHER PUBLICATIONS

*Pigment & Resin Technology*, vol. 16, No. 3, pp. 4–8 (Mar. 1987).

* cited by examiner

Primary Examiner—Samuel A. Acquah
Assistant Examiner—U. K Rajguru
(74) Attorney, Agent, or Firm—Norris, McLaughlin & Marcus

(57) ABSTRACT

A paint composition which comprises a binder component which includes a polyvinylidene fluoride polymer and a solvent component. The polyvinylidene fluoride polymer has a melt viscosity of at least 40 kPoise. Such paint compositions have low gloss and are useful as exterior weather-resistant paints for buildings where low-gloss paints are preferred.

21 Claims, 1 Drawing Sheet

LOW-GLOSS PAINTS INCLUDING POLYVINYLIDENE FLUORIDE HAVING A HIGH MELT VISCOSITY

Figure 1:
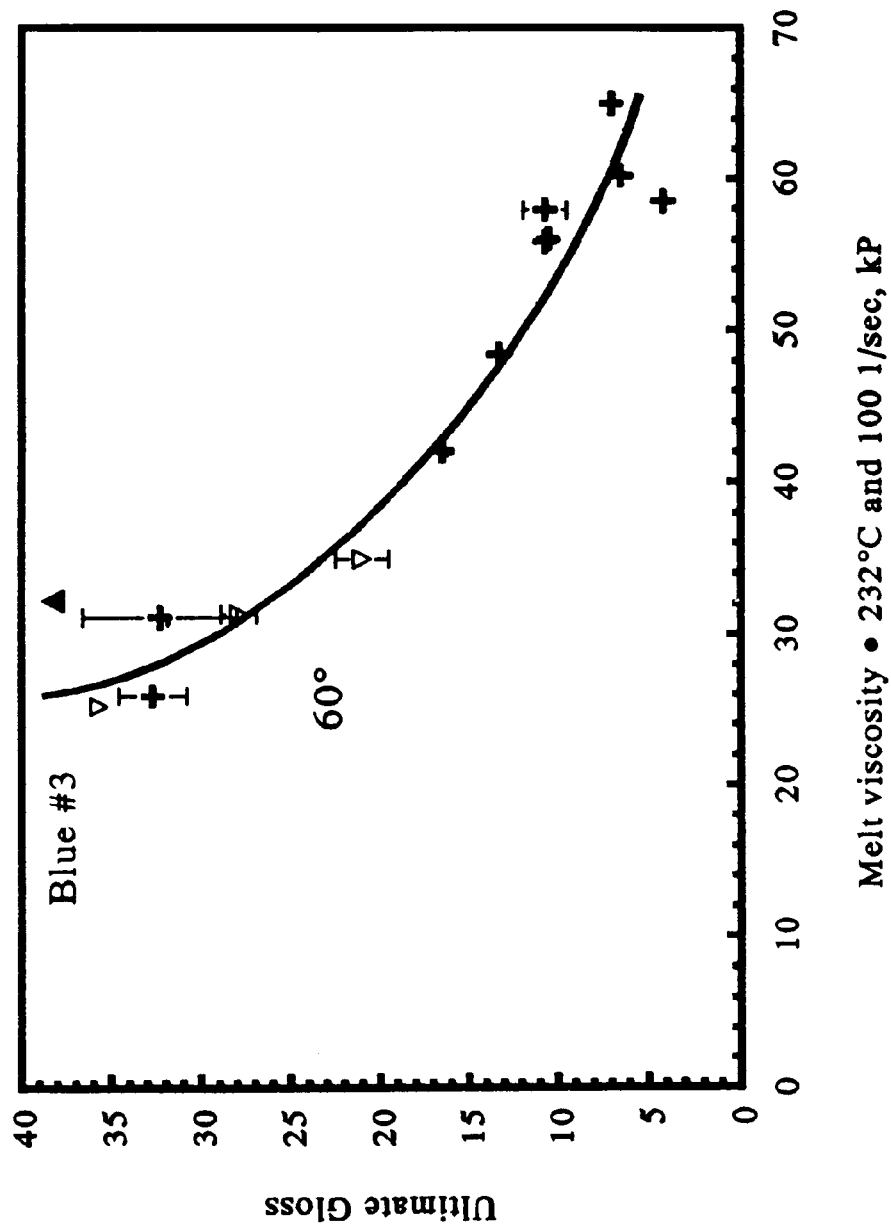

This invention relates to paints, and in particular to paints that are used exteriorly. More particularly, this invention relates to exterior use paints having a low gloss and which include polyvinylidene fluoride polymers having a high melt viscosity. This invention also relates to polymerization processes for making polyvinylidene fluoride polymers with high melt viscosities to provide coating formulations with low gloss performance.

Polyvinylidene fluoride (PVDF) containing materials have been used as maintenance-free coatings or paints due to their long-term weatherability. The current commercial PVDF-containing paints provide coatings with a 60° gloss of 30 (ASTM Designation D523-89) using a standard pigmented base formula, such as a blue base formula, after coating development. Because of the evolution of construction materials, however, the need exists to have weatherable coatings with broadened gloss scale. Currently, a PVDF paint or coating having a reduced gloss is available which includes a flatting agent such as fumed silica. Such a coating, however, has reduced weatherability. A PVDF containing paint or coating normally is a thixotropic dispersion and is difficult to formulate into a low-gloss product due to poor application rheology after the addition of an effective amount of flatting agents.

It therefore is an object of the present invention to provide a polyvinylidene fluoride-containing paint which has a low gloss without sacrificing weatherability and appliability of the paint.

In accordance with an aspect of the present invention, there is provided a paint composition comprising from about 30 wt. % to about 70 wt. %, based on the weight of the composition, of a binder component, and from about 30 wt. % to about 70 wt. % of a solvent component. The binder component comprises at least about 35 wt. %, based on the total weight of said binder component, of a polyvinylidene fluoride polymer having a melt viscosity of at least 40 kPoise, and from 0 wt. % up to about 65 wt. %, based on the total weight of the binder component, of a polymer compatible with polyvinylidene fluoride. The composition may further include a pigment, wherein said pigment is present in the composition at a pigment-to-binder weight ratio from 0 to about 0.8.

Current polyvinylidene fluoride resins for use in maintenance-free paints have a melt viscosity of from about 29 kPoise to about 33 kPoise. Applicants have found that, when one polymerizes vinylidene fluoride such that the resulting polyvinylidene fluoride polymer has a melt viscosity of at least 40 kPoise, and formulates a paint including such polymer, that such paint has a reduced gloss while being easy to apply and retaining weatherability.

In one embodiment, the polyvinylidene fluoride polymer has a melt viscosity of from about 40 kPoise to about 100 kPoise, preferably from about 50 kPoise to about 70 kPoise.

In one embodiment, the binder component is present in an amount of from about 40 wt. % to about 60 wt. %, and preferably at about 50 wt. %, based on the weight of the composition.

In another embodiment, the polyvinylidene fluoride is present in an amount of from about 60 wt. % to about 80 wt. %, based on the weight of the binder component. The polymer compatible with polyvinylidene fluoride may be present in an amount of from about 20 wt. % to about 40 wt. %, based on the weight of the binder component.

The term "polymer compatible with polyvinylidene fluoride," as used herein, means a polymer which may be contained in the paint composition, and which is miscible thermodynamically with polyvinylidene fluoride and does not impair the weatherability of the final paint composition.

Polymers compatible with polyvinylidene fluoride which may be employed include, but are not limited to, acrylic resin polymers such as polymethyl methacrylate, polymethyl acrylate, polyethyl acrylate, polyethyl methacrylic, and copolymers of the above acrylics, as well as polyvinyl acetate. The binder of the paint composition may contain mixtures of these polymers as well. An example of an acrylic polymer composition which may be employed is a 70:30 copolymer of methyl methacrylate and ethyl acrylate polymer having a molecular weight of about 88,000 known as Acryloid B44, a product of Rohm and Haas, Philadelphia, Pa.

In another embodiment, the solvent component is present in the composition in an amount of from about 40 wt. % to about 60 wt. %, preferably at about 50 wt. %. Examples of solvents which may be employed include, but are not limited to, one or more of the following: toluene, isophorone, butyrolactone, carbitol acetate, dimethyl phthalate, and propylene carbonate.

In one embodiment, the pigment is present in the composition at a pigment-to-binder weight ratio of from about 0.3 to about 0.6.

Pigments which may be employed include any pigment which may be employed in paint formulations. Examples of such pigments include, but are not limited to, Arctic blue #3, topaz blue #9, Olympia blue #190, walnut brown #10, golden brown #19, maple yellow #25, honey yellow #29, jade green #4, sherwood green #5, camouflage green #179, and jet black #1, all supplied by Shepherd; titanium dioxide Green No. 5 (a mixture of oxides of nickel, titanium, zinc, cobalt, and antimony described in French Patent Application No. 2,659,973); iron oxide-containing pigments; aluminum oxide containing pigments; silica-containing pigments; zirconium oxide-containing pigments; carbon black; lead carbonate-containing pigments; and lead chromate-containing pigments.

In general, the polyvinylidene fluoride polymers which have an increased melt viscosity also have an increased molecular weight vis-a-vis those polyvinylidene fluoride polymers having lower melt viscosities. The molecular weight of the polyvinylidene fluoride polymer may be increased by reducing the amount of free radical initiator present in the polymerization reaction mixture. In general, the free radical initiator, such as, for example, di-t-butyl peroxide, or DTBP, is added to the polymerization reaction mixture in an amount of from about 0.02 g to about 3.0 g per kg of vinylidene fluoride monomer, preferably from about 0.10 g to about 2.0 g per kg of vinylidene fluoride monomer.

In general, melt viscosity measurement is used to characterize high molecular weight polyvinylidene fluoride polymers. The general relationship between molecular weight, M, and melt viscosity, η, of a high molecular weight polymer has been established theoretically as:

$\eta = kM^{3.5}$, wherein k is a constant. (Meares, Polymers: *Structure and Bulk Properties*, Van Nostrand Reinhold Company, London, pg. 358 (1965)).

In general, such polyvinylidene fluoride polymers in accordance with the present invention, also have an increased gel content and increased branching of the polymer chain vis-a-vis polyvinylidene fluoride polymers having lower melt viscosities.

In a preferred embodiment, the polyvinylidene fluoride polymers are formed by an emulsion polymerization process, which employs a fluorosurfactant, such as, for example, ammonium perfluorooctanoate. Such emulsion polymerization may be effected at a temperature of from about 110° C. to about 125° C. The polymerization may be carried out in the presence of a water soluble or insoluble initiator. The initiator may be DTBP, which may be present in amounts hereinabove described.

The resulting polyvinylidene fluoride product has a melt viscosity of at least 40 kPoise, has an increased molecular weight, and an increased gel content. Such polymer also has increased branching of the polyvinylidene fluoride polymer chain.

The resulting polyvinylidene fluoride polymer, which may be in the form of a powder and which has a melt viscosity of at least 40 kPoise, and preferably from about 40 kPoise to about 100 kPoise, and more preferably from about 50 kPoise to about 70 kPoise, and has an increased gel content and an increased molecular weight, then is mixed with one or more solvents, a pigment, if needed, and a polymer which is compatible with polyvinylidene fluoride, such as an acrylic resin, or mixture of acrylic resins, in the amounts hereinabove described. The polyvinylidene fluoride powder becomes dispersed in the resulting mixture to form a paint. The paint is applied to at least one surface of a substrate, such as a metal substrate, and the painted substrate is baked at a temperature of from about 400° F. to about 550° F., preferably from about 440° F. to about 510° F. During such baking, the solvents are evaporated, and a dry coating of paint is formed on the metal substrate. The paint compositions of the present invention also may be employed for coating other materials, such as, but not limited to, glass and ceramics.

Upon drying, the polyvinylidene fluoride is present in the paint in an amount of at least 35 wt. %, preferably at least 40 wt. %, and more preferably at about 70 wt. %. The pigment, when present, is present in an amount up to about 40 wt. %, preferably in an amount of up to about 30 wt. %, and more preferably at about 25 wt. %. The polymer which is compatible with polyvinylidene fluoride, which may be an acrylic resin, is present in an amount up to about 60 wt. %, preferably from about 20 wt. % to about 40 wt. %.

The coated substrate then is quenched in a water bath. The paint has a low gloss, and passes all coating criteria such as flexibility, adhesion, boiling water resistance, methyl ethyl ketone rub resistance, hardness, and paint rheology.

Uses for the paint compositions of the present invention include any exterior paint coating for which a low gloss is desired. Such uses include, but are not limited to, exterior paints for airport buildings such as airport terminals, airplane hangars, airport gates, and air freight buildings; bus terminals; railroad stations and terminals; railroad crossing signals; railroad block signals; railroad switches; bridges; residential and industrial roofing; street light and traffic light support structures. It also is to be understood that the scope of the present invention is intended to encompass coated substrates, which are parts coated with the paint composition of the present invention, such parts being employed in the assembly of the structures hereinabove described.

The invention now will be described with respect to the drawing, wherein:

FIG. 1 is a graph of the 60 degree gloss results of the paint coatings of the examples as a function of melt viscosity of the polyvinylidene fluoride polymer.

The invention now will be described with respect to the following examples; however, the scope of the present invention is not intended to be limited thereby.

In the following examples, the following components were combined in the following proportions, as shown in Table I below, to make the paint compositions.

TABLE I

Standard Coating Formulation

| Component | Parts |
| --- | --- |
| Blue Base | |
| Acryloid B44 | 42.85 |
| Isophorone | 150.00 |
| Arctic blue #3 | 42.85 |
| Paint | |
| Blue Base | 89.1 |
| PVDF | 37.9 |
| Toluene | 24.4 |

Also in the following examples, melt viscosities are determined in accordance with ASTM Designation D3835-93a, Standard Test Method for Determination of Properties of Polymeric Materials by Means of a Capillary Rheometer, published December 1993. 60° gloss values are determined in accordance with ASTM Designation D523-89, Standard Test Method for Specular Gloss, published May 1989.

EXAMPLE 1

A 7.5 liter stainless steel horizontal reactor, equipped with a paddle agitator, was charged with 5,375 g deionized water, 2.99 g of a fluorosurfactant containing primarily ammonium perfluorooctanoate and 4 g of a hydrocarbon wax melting at 50° C. to 60° C. The reactor was sealed and deaerated by heating with agitation to 100° C., and then venting steam and air from the reactor for two minutes. The reactor then was heated to 122.5° C. Sufficient vinylidene fluoride monomer was introduced from a cylinder to bring the reactor pressure to 650 psig. 19.1 ml (6.6 g/kg of PVDF monomer) of di-tert-butyl peroxide (DTBP) was pumped into the reactor to initiate the polymerization.

After an induction period of approximately 15 minutes, the reactor pressure decreased slightly, indicating initiation. Vinylidene fluoride then was continuously added as needed to maintain the reactor pressure at 650 psig while the reactor temperature was maintained at 122.5° C. After 200 minutes, when a total of 2,298 g vinylidene fluoride had been fed to the reactor, the monomer feed was stopped. In order to maximize the yield, the system was allowed to continue reacting until the reactor pressure was decreased to 150 psig. At that point, the reactor was cooled, the unreacted vinylidene fluoride was vented, and the latex was drained from the reactor.

The resulting latex, containing 28.7% solids by weight, was isolated by nitric acid coagulation. The recovered polymer was washed to neutral pH with deionized water, and dried in a convection oven at 60° C. The polymer had a crystalline melting point of 161.3° C. as measured by differential scanning calorimetry. The polymer melt viscosity was 32.7 kPoise at 232° C. and a shear rate of 100 sec.$^{-1}$ as measured with a Kayeness Galaxy V capillary rheometer with an L/D ratio of 15:1.

EXAMPLE 2–7

Polyvinylidene fluoride resins having high melt viscosities (i.e., greater than 40 kPoise) were prepared according to the process of Example 1, except that one or more of the following parameters: amount of monomer added; reaction temperature; amount of DTBP added; and amount of surfactant added were changed. The change in reaction conditions with respect to one or more of the hereinbefore mentioned properties are given in Table II below.

TABLE II

| Example | Monomer added, q | Reaction temp., ° C. | DTBP added (g/kg monomer) | Surfactant added (g/l) | Melt Viscosity, k Poise |
|---|---|---|---|---|---|
| 2 | 2,298 | 115 | 3.4 | 0.56 | 42.0 |
| 3 | 2,168 | 115 | 1.8 | 0.56 | 48.4 |
| 4 | 1,898 | 125 | 0.42 | 0.56 | 56.0 |
| 5 | 2,298 | 125 | 0.34 | 0.56 | 58.5 |
| 6 | 2,298 | 125 | 0.34 | 0.45 | 57.9 |
| 7 | 2.298 | 125 | 0.34 | 0.37 | 55.8 |

EXAMPLES 8–14

Each of the polyvinylidene fluoride preparations of Examples 1–7, respectively, is formulated into a paint formulation in accordance with the proportions given in Table I to form the paint formulations of Examples 8–14, respectively. In order to make each paint formulation, Acryloid B44 acrylic resin was blended with isophorone and Arctic Blue #3 pigment in a sand mill twice to make a blue base. One of the polyvinylidene fluoride powders then was dispersed in a mixture containing the blue base thinned with toluene by a high shear mixer for 5 hours. The paint then was applied to an aluminum substrate, and baked in a 540° F. oven to obtain a peak metal temperature of 460° F. The coated substrate then was quenched in a water bath at room temperature. The paint of each example was characterized for its 60° gloss. A commercial polyvinylidene fluoride product, HYLAR 5000, having a melt viscosity of 31 kPoise at 232° C. and a shear rate of 100 $sec^{-1}$ was used as a reference. The 60° gloss results of these coatings as a function of the melt viscosity of PVDF are shown in FIG. 1.

As shown in FIG. 1, the gloss of a PVDF coating decreases quickly with increasing melt viscosity when the melt viscosity is below 35 kPoise. The gloss reduction rate decreases when the melt viscosity exceeds 35 kPoise. If low-gloss at 60° is defined arbitrarily to be 15 or lower the melt viscosity of the PVDF resin should be at least 48 kPoise. In order to obtain a PVDF paint having a gloss of 10 or lower, the PVDF resin should have a melt viscosity of at least 54 kPoise.

The paint of each example also was tested for methyl ethyl ketone (MEK) double rubs; pencil hardness; adhesion; and reverse impact. Methyl ethyl ketone (MEK) resistance was measured in accordance with ASTM Designation D-4752-87, published January 1988. The paint of each example had an MEK resistance of greater than 100 double rubs. Pencil hardness was measured in accordance with ASTM Designation D3363-74, Standard Test Method for Film Hardness by Pencil Test, published November 1974 (reapproved 1989). The paint of each example had a pencil hardness of HB based on the following scale:

6B-5B-4B-3B-2B-B-HB-F-H-2H-3H-4H-5H-6H

Softer                                                                 Harder

Adhesion was measured in accordance with ASTM Designation D-3359-87, Standard Test Methods for Measuring Adhesion by Tape Test, published September 1987. The point of each example had an adhesion rating of 5B on a scale of from 0B to 5B. Such a rating is indicative of no detachment of the paint from its substrate.

Reverse impact testing was conducted in accordance with ASTM Designation D2794-84, Standard Test Method for Resistance of Organic Coatings to the Effects of Rapid Deformation (Impact), published November 1984. The paint of each example had a reverse impact of greater than 80 inch-pounds.

EXAMPLES 15–16

Two industrial scale-up versions, referred to as Example 15 and Example 16, respectively, of the paint composition of the present invention, were formulated. The paint of each industrial scale-up was formed under the following conditions:

An 1,800 gallon reactor was charged with 8,650 pounds of deionized water, 4.5 pounds of a fluorosurfactant containing primarily of ammonium perfluorooctanoate and 1 pound of a hydrocarbon wax melting at 50° C. to 60° C. The reactor was sealed and deaerated by heating with agitation to 100° C., and then venting steam and air from the reactor for two minutes. The reactor then was heated to 125° C. Sufficient vinylidene fluoride monomer was introduced from a cylinder to bring the reactor pressure to 650 psig. 31 ounces of di-tert-butyl-peroxide (DTBP) was pumped into the reactor to initiate the polymerization.

After an induction period of approximately 15 minutes, the reactor pressure decreased slightly, indicating initiation. Vinylidene fluoride then was continuously added as needed to maintain the reactor pressure at 650 psig while the reactor temperature was maintained at 125° C. After 200 minutes, when a total of 3,500 pounds of vinylidene fluoride had been fed to the reactor, the monomer feed was stopped. In order to maximize the yield, the system was allowed to continue reacting until the reactor pressure was decreased to 150 psig. At that point, the reactor was cooled, the unreacted vinylidene fluoride was vented, and the latex was drained from the reactor.

The resulting latex was isolated by nitric acid coagulation. The polymer of Example 15 had a melt viscosity of 66.8 kPoise, and the polymer of Example 16 had a melt viscosity of 65.1 kPoise.

Each of the polymers then was formulated into a paint formulation according to the procedure described with respect to the paint formulations of Examples 8–14. Each paint then was applied to an aluminum substrate, and baked in a 540° F. oven to obtain a peak metal temperature of 460° F. The coated substrates then were quenched in a water bath at room temperature. The paint of each example was characterized for its 60° gloss. The paint of each example had a 60° gloss of 7.

The disclosure of all patents, publications, including published patent applications, and database entries referenced in this specification are specifically incorporated by reference in their entirety to the same extent as if each such individual patent, publication, and database entry were specifically and individually indicated to be incorporated by reference.

It is to be understood, however, that the scope of the present invention is not to be limited to the specific embodiments described above. The invention may be practiced other than as particularly described and still be within the scope of the accompanying claims.

What is claimed is:

1. A paint composition comprising:
  (a) from about 30 wt. % to about 70 wt. %, based upon the weight of said paint composition, of a binder component, wherein said binder component comprises at least about 35 wt. %, based on the total weight of said binder component, of a polyvinylidene fluoride polymer having a melt viscosity of at least 40 kPoise, and from 0 wt. % to about 65 wt. %, based on the total weight of the binder component, of a polymer compatible with polyvinylidene fluoride;

(b) from about 30 wt. % to about 70 wt. %, based on the weight of said paint composition, of a solvent component; and (c) a pigment, wherein said pigment is present in said composition at a pigment-to-binder weight ratio of from 0 to about 0.8.

2. The composition of claim 1 wherein said polyvinylidene fluoride polymer has a melt viscosity of from about 40 kPoise to about 100 kPoise.

3. The composition of claim 2 wherein said polyvinylidene fluoride polymer has a melt viscosity of from about 50 kPoise to about 70 kPoise.

4. The composition of claim 1 wherein binder component is present in an amount of from about 40 wt. % to about 60 wt. %, based upon the weight of said composition.

5. The composition of claim 4 wherein said binder component is present in an amount of about 50 wt. %, based upon the weight of said composition.

6. The composition of claim 1 wherein said polyvinylidene fluoride is present in an amount of from about 60 wt. % to about 80 wt. %, based on the weight of the binder component.

7. The composition of claim 1 wherein said polymer compatible with polyvinylidene fluoride is present in an amount of from about 20 wt. % to about 40 wt. %, based on the weight of said binder component.

8. The composition of claim 6 wherein said polymer which is compatible with polyvinylidene fluoride is an acrylic resin.

9. The composition of claim 1 wherein said solvent component is present in said composition in an amount of from about 40 wt. % to about 60 wt. %, based on the weight of said composition.

10. The composition of claim 9 wherein said solvent component is present in said composition in an amount of about 50 wt. %, based on the weight of said composition.

11. The composition of claim 1 wherein said solvent component includes at least one solvent selected from the group consisting of toluene, isophorone, butyrolactone, carbitol acetate, dimethyl phthalate, and propylene carbonate.

12. A coated substrate, said substrate including at least one surface, wherein at least one surface of said substrate is coated with a paint including at least 35 wt. % of a polyvinylidene fluoride polymer having a melt viscosity of at least 40 kPoise.

13. The substrate of claim 12 wherein said polyvinylidene fluoride polymer has a melt viscosity of from about 40 kPoise to about 100 kPoise.

14. The substrate of claim 13 wherein said polyvinylidene fluoride has a melt viscosity of from about 50 kPoise to about 70 kPoise.

15. The substrate of claim 12 wherein said polyvinylidene fluoride is present in said paint in an amount of at least 40 wt. %.

16. The substrate of claim 15 wherein said polyvinylidene fluoride is present in said paint in an amount of about 70 wt. %.

17. The substrate of claim 12 wherein said paint further includes a polymer compatible with polyvinylidene fluoride, said polymer compatible with polyvinylidene fluoride being present in said paint in an amount up to 60 wt. %.

18. The substrate of claim 12 wherein said paint further includes a pigment, said pigment being present in said paint in an amount up to 40 wt. %.

19. The substrate of claim 18 wherein said pigment is present in said paint in an amount up to 30 wt. %.

20. The substrate of claim 19 wherein said pigment is present in said paint in an amount of 25 wt. %.

21. The composition of claim 1 wherein said pigment is present in said composition at a pigment-to-binder weight ratio of from about 0.3 to about 0.6.

\* \* \* \* \*